Patented July 3, 1945

2,379,687

UNITED STATES PATENT OFFICE 2,379,687

CATALYSTS

Chester C. Crawford, El Cerrito, and William E. Ross, Berkeley, Calif., assignors to Shell Development Company, San Francisco, Calif., a corporation of Delaware No Drawing. Application September 22, 1942, Serial No. 459,326

1 Claim. (Cl. 252—199)

This invention relates to new and useful catalysts comprising aluminum halides for improved catalytic conversions executed with the aid of aluminum halide-containing catalysts.

The aluminum halides are known to possess the ability to catalyze a great number of chemical reactions. Because of its availability and relatively low cost, the use of the chloride is generally preferred. Many of the aluminum chloride catalysts utilized heretofore, however, possess distinct disadvantages which often render their use on a practical scale difficult, if not impossible. Aluminum chloride either per se or supported upon a support material generally does not permit the attainment of the degree of contact between catalyst and material being treated required to obtain the most efficient results. This is particularly so when operating in the liquid phase; and many processes, such as, for example, the treatment or conversion of hydrocarbons, are often effected more advantageously in the liquid phase. A further disadvantage often inherent in the use of solid aluminum chloride catalysts resides in the difficulty with which a desired catalyst bed temperature can be effectively maintained, due to the poor heat conductivity of most of these catalysts. Since a considerable portion of these solid catalysts often consists of the inert support material, a relatively large reaction zone is generally needed for relatively small amounts of the active catalyst constituent.

The use of aluminum chloride in the molten state is entirely unsatisfactory because of its high melting point and relatively high volatility. Modified forms of aluminum chloride catalysts comprising, for example, aluminum chloride in admixture with other halide salts have been proposed. Certain of these mixtures possess melting points which are appreciably lower than that of aluminum chloride. However, such mixed catalysts, when used in the compositions at which they possess desirable catalytic activity generally still possess melting points which are sufficiently high not only to prevent their efficient use in reactions which must be conducted at relatively low temperatures, but to entail serious difficulties in moving the catalysts in their molten form through the system. To avoid the latter difficulty means must be resorted to, such as, for example, the heating or elaborate lagging of pipes to prevent the freezing of any part of the catalyst therein. Sludge-type catalysts, such as organic aluminum chloride complexes, have a relatively limited field of application and these also present serious difficulties not only in the handling of these materials within the system, but in their separation from the product. The complex catalysts generally become quite viscous at low temperatures, often approaching the consistency of a paste at temperatures of, for example, about 20° C., thereby rendering extremely difficult the movement of the catalysts within the system and also making difficult, if not impossible, the obtaining of a proper degree of contact between the catalyst and the material being treated. Slight amounts of impurities in the charge, furthermore, aid in quickly increasing the viscosity of such sludge-type catalysts at the lower temperatures to a point where the duration of the operation is far below that permissible in a practical operation. It is, therefore, readily apparent that aluminum halide-containing catalysts of high activity which are able to maintain their fluidity and activity at relatively low temperatures in the absence of the above-described difficulties are highly desired.

It is an object of the present invention to provide an improved aluminum halide-containing catalyst adapted for more efficient use in the liquid phase at relatively low temperatures.

Another object of the invention is to provide an improved aluminum chloride-containing catalyst particularly adapted for the more efficient catalytic treatment or conversion of hydrocarbons in the liquid phase.

The improved catalysts of the invention are obtained by combining an aluminum halide, such as, for example, aluminum chloride with a halide salt of a cyclic nitrogen base containing the nitrogen atom within the ring, such as, for example, a halide salt of pyridine, pyrollidine, quinoline, alkyl derivatives thereof, etc. Of the halide salts of the cyclic nitrogen bases the chlorides are generally preferred. The catalysts of the invention are not necessarily limited, however, to those containing only chloride salts, and a halide of aluminum other than aluminum chloride, such as, for example, aluminum bromide may constitute a part or all of the aluminum halide component of the catalyst. Similarly, halide salts of the cyclic nitrogen bases other than the chlorides may comprise a part or all of the component consisting of the halide salt of a nitrogen base. The proportions of the components in the catalysts may vary within the scope of the invention in accordance with the particular characteristics of the catalyst desired, operating conditions at which they are to be employed, the nature of the material to be treated, and the like. The degree of catalytic activity, as well as other properties of the catalysts affecting their efficient use under particular operating conditions, are, however, dependent upon their composition. Since the aluminum halides react with the halide salt of the cyclic nitrogen bases, it is sometimes preferred, and for certain reactions essential, that the aluminum halide be present in molecular excess.

A particularly efficient catalyst consists of the admixture of anhydrous aluminum chloride and pyridine hydrochloride. Pyridine hydrochloride itself has a melting point of about 144° C. It has been found that pyridine hydrochloride and aluminum chloride exhibit compound formation; the 1:1 molar addition complex ($C_5H_5N \cdot HCl \cdot AlCl_3$) melting at approximately 120–125° C. The addition of aluminum chloride to the mixture above the equimolecular amount results in catalysts particularly suitable for catalyzing hydrocarbon reactions. When utilizing the catalysts in the liquid state the temperature of a particular operation will govern the content of $AlCl_3$ in the catalyst. Mixtures of aluminum chloride and pyridine hydrochloride containing from 50 to 83 percent by weight of $AlCl_3$ have a maximum melting point of about 150° C., whereas those having an aluminum chloride content of from about 63 to 77 percent by weight have a maximum melting point of only about 80° C. Catalyst mixtures consisting of or approaching the eutectic composition are particularly preferred. The eutectic composition consisting of 66 percent by weight of aluminum chloride and 34 percent by weight of pyridine hydrochloride melts below approximately 40° C. The solutions of aluminum chloride in pyridine hydrochloride, however, possess the very attractive feature of being able to undergo supercooling to an unusual degree, and their melting points are therefore not indicative of the minimum temperature at which they can be used efficiently in the liquid state. Thus, the aluminum chloride-pyridine hydrochloride catalyst containing about 66 percent by weight of $AlCl_3$, though possessing a melting point of approximately 40° C., can be used efficiently in the liquid state not only at room temperature (20° C.) but at temperature as low as 0° C.

It is apparent from the foregoing that the invention provides aluminum halide catalysts which can be used in the liquid state at lower temperatures than has been possible with the aluminum halide-containing catalysts available heretofore. The catalysts of the invention are particularly suited for use in the execution of catalytic processes which must be effected, either preferably or of necessity, in the liquid phase at relatively low temperatures. The catalysts are particularly applicable to the execution of many hydrocarbon reactions such as alkylation, or the isomerization of the more readily degraded paraffinic hydrocarbons. It is well known that paraffinic hydrocarbons having more than four carbon atoms to the molecule, particularly pentane, undergo substantial decomposition in the presence of active aluminum halide catalysts at temperatures as low as 80° C. Such decomposition not only results in considerable loss of the material treated but results in the rapid degradation of the catalyst activity due to the presence of byproducts formed. Since a great many of the aluminum halide catalysts available heretofore melt at temperatures substantially in excess of even 100° C., it is apparent that such catalysts are not suitable for the isomerization of pentane in the liquid phase. Though certain mixtures of molten salts comprising aluminum chloride have melting points below 100° C., the relatively narrow temperature range between the minimum temperature at which these mixtures can be maintained in the liquid phase and the maximum temperature at which they can be used for the isomerization of saturated hydrocarbons having at least five carbon atoms to the molecule, is generally too small to assure complete freedom from the danger of freezing at least a part of the catalyst within the system, or to enable any substantial variation in catalyst composition. The greater fluidity of the catalysts of the invention at the lower temperatures on the other hand presents a distinct advantage over catalyst mixtures possessing higher viscosities at the temperature of operation since the conversion obtained depends greatly on the contact efficiency which in turn is a direct function of the viscosity of the liquid catalysts. The catalysts of the invention are also free of the salt components more readily soluble in hydrocarbons, so often present in mixed salt catalysts used heretofore, and therefore eliminate the need for a subsequent operation to remove dissolved catalyst from the products.

Illustrative of reactions to which the catalysts of the invention may be applied with particular advantage is the low temperature alkylation of organic compounds containing a hydrogen atom replaceable by an alkyl radical, such as, for example, the reaction of a branched chain paraffin hydrocarbon with a straight chain olefinic hydrocarbon, described and claimed in copending application, Serial Number 485,946, filed May 5, 1943, which matured into U. S. Patent No. 2,337,014, issued December 14, 1943. The efficiency of the catalysts of the invention in catalyzing this reaction is illustrated by the following examples:

*Example I*

A mixture of propylene and isobutane containing 86 per cent by weight of isobutane was treated with a liquid catalyst consisting of 69 per cent by weight of anhydrous aluminum chloride and 31 per cent by weight of pyridine hydrochloride at a temperature of 10° C. The product obtained consisted of 71 per cent by weight of isobutane and 29 per cent by weight of material higher boiling than isobutane, which higher boiling material contained 76 per cent by weight of heptanes. 48 per cent of the propylene charged interacted with isobutane to form heptanes.

*Example II*

Mixtures of propylene and isopentane were treated with a catalyst consisting of 69 per cent by weight of aluminum chloride and 31 per cent by weight of pyridine hydrochloride at temperatures of 25° C., 15° C., and 0° C.; the catalyst maintaining its liquid state throughout the operations. The composition of the charge and results obtained are indicated in the following table:

| | A | B | C |
|---|---|---|---|
| Temperature, °C | 25 | 15 | 0 |
| Per cent isopentane in charge | 85 | 82 | 80 |
| Per cent isopentane in product | 51 | 71.5 | 59 |
| Per cent octanes in products boiling above isopentane | 41 | 31 | 37 |
| Per cent of propylene charged interacting with isopentane to form octanes | 45 | 15 | 25 |

The alkylation in the liquid phase with the aid of the catalysts of the invention, utilized in the liquid state, is preferably executed at temperatures not substantially in excess of about 25° C. The invention is, however, not limited to alkylations which are conducted most advantageously at these low temperatures and where required higher temperatures may be used. A pressure sufficiently high to at least maintain the reactants in the liquid phase is applied. As stated above, alkylation reactions other than those comprising the interaction of a saturated branched chain paraffin with a straight chain olefin are comprised within the scope of the invention. Alkylating reactions to which the catalyst may be advantageously applied comprise the interaction of cycloparaffins with olefinic hydrocarbons, saturated straight chain hydrocarbons with diolefins, aromatic hydrocarbons with straight chain olefins, phenols with diolefins, and the like.

Another type of catalytic reaction to which the catalysts of the invention can be applied with particular advantage in the liquid state is the isomerization in the liquid phase, at relatively low temperature conditions, of the more readily degraded hydrocarbons, such as, for example, the conversion of normal or branched chain saturated hydrocarbons having at least five carbon atoms to the molecule to branched or more highly branched chain saturated hydrocarbons having the same number of atoms to the molecule, described and claimed in co-pending application, Serial Number 485,947, filed May 5, 1943, which matured into U. S. Patent No. 2,337,015, issued December 14, 1943. This is illustrated by the following example:

Example III

Normal pentane was treated in the liquid phase with a molten catalyst consisting of 69 per cent by weight of anhydrous aluminum chloride and 31 per cent by weight of pyridine hydrochloride. A volume ratio of catalyst to hydrocarbon of 1 to 6.5 was employed. Hydrogen chloride in an amount of 4 per cent by weight of the pentane treated was introduced into the reactor. Temperature of operation, time of contact and amount of isopentane obtained in per cent by weight of the total hydrocarbons removed from the reactor are indicated in the following table:

| Temperature | Time of contact | Isopentane |
|---|---|---|
| °C. | | Per cent |
| 40 | 30 min. | 22.3 |
| 40 | 2 hrs. | 34.3 |
| 60 | 15 min. | 57.2 |

The invention thus enables the isomerization of hydrocarbons with the aid of a liquid aluminum halide-containing catalyst at temperatures considerably lower than possible heretofore. The possibility of attaining equilibrium mixtures containing higher proportions of isoparaffins to normal paraffins at the lower temperatures, taken together with the ease with which the process can be executed at these lower temperatures due to the increased fluidity of the liquid catalysts employed, contribute considerably to offset the apparent advantages of more rapid isomerization rates at higher temperatures.

The isomerization of isomerizable hydrocarbons in the liquid phase in the presence of the catalysts of the invention utilized in the liquid state is preferably executed at a temperature not substantially in excess of about 70° C., and the more readily degraded hydrocarbons, such as, for example, pentane, are preferably isomerized at a temperature not substantially in excess of about 65° C. A sufficiently high pressure is maintained to keep the reactants in the liquid phase.

Though pentane has been chosen as the isomerizable saturated hydrocarbon in the above example, it is to be pointed out that the invention is not limited to the isomerization in the liquid phase of a specific hydrocarbon, and that other isomerizable hydrocarbons having more than five carbon atoms to the molecule, such as the saturated hydrocarbons having from five to ten carbon atoms to the molecule, may advantageously be isomerized in the liquid phase. The charge need, furthermore, not necessarily comprise but a single hydrocarbon and may contain other hydrocarbons which may or may not be capable of isomerization under the conditions of execution of the process. Thus, when treating a mixture of hydrocarbons comprising butane and pentane under the above specified conditions, pentane is found to be selectively isomerized. The liquid phase isomerization process is also applicable to the isomerization of other than open chain paraffin hydrocarbons. It may be applied, for example, to the isomerization of naphthenic hydrocarbons, such as methyl cyclopentane, dimethyl cyclopentane, methyl cyclohexane, dimethyl cyclohexane, etc. Hydrocarbon fractions comprising substantial amounts of isomerizable saturated hydrocarbons, such as, for example, fractions of straight run gasoline, casinghead gasoline, etc., may be treated under the liquid phase isomerizing conditions to produce products suitable for alkylation with olefins and which have improved ignition characteristics.

Illustrative of other processes to which the catalysts of the invention may be applied with advantage in the liquid state at relatively low temperatures are the treating or refining operations wherein hydrocarbons or hydrocarbon mixtures are subjected to contact with a liquid-treating agent. A particular application is their use in the treatment of lubricating oils or lubricating oil-containing fractions to effect the removal of impurities therefrom. The lubricating oils or lubricating oil fractions and the catalysts in the liquid state may be contacted in concurrent or countercurrent flow for a time sufficiently long to effect the desired purification and improvement of the lubricating oil, whereupon the catalyst and hydrocarbons are separated and the catalyst optionally recycled to the treating zone.

It is to be understood that the above examples are but a few of the many reactions conducted at relatively low temperatures in which the catalysts of the invention can be applied with advantage in the liquid state, and that the application of the novel catalysts is not limited thereto.

Though the catalysts of the invention can be applied with particular advantage to processes executed in the liquid phase at relatively low temperatures, their application is not necessarily limited thereto. The catalysts of the invention may also be utilized in the fluid state as catalysts in catalytic processes involving the execution of reactions at higher temperatures and wherein the reactants may optionally be in the vapor phase. Thus, the fluid catalysts of the invention may be applied to such processes conducted at higher temperatures as those comprising, for example, the degradation of hydrocarbons; conversion of higher boiling hydrocarbons into lower boiling hydrocarbons; polymerization of normally gaseous olefinic hydrocarbons; isomerization of the less readily degraded hydrocarbons, such as, for example, butane; hydrocarbon reversion operations wherein normally liquid hydrocarbons are contacted with the catalyst in the presence of lower boiling, preferably gaseous hydrocarbons, whereby interaction of the lower boiling and higher boiling hydrocarbons is brought about simultaneously with conversion reactions the specific nature of which reactions are dependent upon the operating conditions used; chlorination of hydrocarbons, etc.

The catalysts of the invention may be utilized in the presence of suitable promoting agents which may vary in nature and in amounts used in accordance with particular operating conditions and the nature of the reaction. Thus, the ability of the catalysts to catalyze hydrocarbon reactions, such as, for example, isomerization and alkylation, is generally enhanced by the presence of a hydrogen halide, such as, for example, hydrogen chloride, or compounds capable of liberating a hydrogen halide under the reaction conditions. In the execution of hydrocarbon reactions wherein hydrocarbon decomposition is undesired, materials capable of suppressing such side reactions as, for example, hydrogen, may be introduced into the reaction zone.

The catalysts of the invention lend themselves to efficient application in processes conducted batchwise, intermittently, or in a continuous manner. It is to be pointed out, however, that the nature of the catalysts renders them particularly advantageous to utilization in continuous processes, comprising, for example, the utilization of externally heated, elongated reaction zones of restricted cross-sectional areas through which the catalyst and reactants are passed in concurrent flow. Effluence from such reaction zones may be passed to a separating zone, wherein the catalyst may be separated readily from the reactants and optionally recycled to the reaction zone.

The marked advantages of the catalysts of the invention in the liquid state over aluminum halide-containing catalysts available heretofore has been stressed. It is to be pointed out, however, that the novel catalysts in the solid state, as well as their use in catalytic process, are not to be considered beyond the scope of the present invention. The catalysts in the solid state may be deposited upon any suitable support material comprising, for example, aluminum oxide, magnesium oxide, bauxite, kieselguhr, silica, silica gel, pumice, majolica chips, carbon, adsorbent clays, or other support materials. The support materials may be subjected to the activating treatments well known in the art prior to being impregnated with the aluminum halide catalysts. The solid catalysts may, furthermore, be modified by the presence of other salts comprising, for example, the halides of the alkali or alkaline earth metals.

We claim as our invention:

A fluid aluminum chloride-containing catalyst consisting of a molten mixture of aluminum chloride and pyridine hydrochloride, said mixture containing about 66 per cent by weight of aluminum chloride.

CHESTER C. CRAWFORD.
WILLIAM E. ROSS.